United States Patent [19]

Ashida et al.

[11] 4,072,636
[45] Feb. 7, 1978

[54] PROCESS FOR PREPARING SMOKE-RETARDANT POLYISOCYANURATE FOAM

[75] Inventors: Kaneyoshi Ashida, Chofu; Masaaki Ohtani, Kawasaki; Shoichi Ohkubo, Yokohama, all of Japan

[73] Assignee: Mitsubishi Chemical Industries Limited, Tokyo, Japan

[21] Appl. No.: 663,503

[22] Filed: Mar. 3, 1976

[30] Foreign Application Priority Data

Mar. 7, 1975 Japan .................................. 50-27780
Mar. 10, 1975 Japan .................................. 50-28853

[51] Int. Cl.² .............................................. C08G 18/14
[52] U.S. Cl. ...................... 260/2.5 AW; 260/2.5 AH; 260/2.5 AJ; 260/2.5 AK
[58] Field of Search ................... 260/2.5 AW, 2.5 AJ, 260/2.5 AK, 2.5 AH

[56] References Cited

U.S. PATENT DOCUMENTS

| | | | |
|---|---|---|---|
| 3,050,477 | 8/1962 | Gmitter et al. | 260/2.5 AB |
| 3,718,612 | 2/1973 | Strickman | 260/2.5 AK |
| 3,900,506 | 8/1975 | Bell et al. | 260/2.5 AJ |
| 3,935,133 | 1/1976 | van Leurven et al. | 260/2.5 AH |

*Primary Examiner*—Eugene C. Rzucidlo
*Attorney, Agent, or Firm*—Oblon, Fisher, Spivak, McClelland & Maier

[57] ABSTRACT

In a process for preparing a smoke-retardant polyisocyanurate foam by reacting an organic polyisocyanate in the presence of a blowing agent and an isocyanate-trimerization catalyst, an improvement is characterized in that the reaction is conducted in the presence of an organosilicate having the formula $Si(OR)_4$ or $R_nSi(OR')_{4-n}$ wherein R and R' are the same or different and represent aliphatic, alicyclic and aromatic hydrocarbon groups having 1–12 carbon atoms or substituted derivatives thereof and $n$ is an integer of 1 to 3.

13 Claims, No Drawings

PROCESS FOR PREPARING SMOKE-RETARDANT POLYISOCYANURATE FOAM

BACKGROUND OF THE INVENTION

1. Field of the Invention:

The present invention relates to a process for preparing a smoke-retardant polyisocyanurate foam which simultaneously has properties of low smoke-generation, low friability, not bursting (ie., not scattering as a powder when touched to a flame), and excellent heat-resistance and flame-resistance.

2. Description of the Prior Arts:

Polyisocyanurate foams have been prepared by blending and stirring an organic polyisocyanate, an isocyanate-trimerization catalyst and a blowing agent and if necessary, a surfactant, (Japanese Patent Publication Nos. 33910/1970 and 2269/1971). Such polyisocyanurate foams have excellent heat-resistance and flame-resistance but suffer from the disadvantages of friability, bursting when touched to a flame and smoke-generation when initially touched to a flame.

In order to improve these disadvantages, various processes for preparing modified polyisocyanurate foams have been proposed, for example a method of using a polyether as a modifier (Japanese Patent Publication Nos. 42386/1971 and 2269/1971); a method of using a polyester as a modifier (Japanese Patent Publication No. 28919/1972); a method introducing a polyoxazolidone linkage (Japanese Patent Publication No. 32800/1974); a method of using a polyether polyol having a molecular weight of higher than 200 and a diol having a molecular weight of lower than 200 as a modifier (Japanese Unexamined Patent Publication No. 101497/1973); a method of using a precondensate of xylene resin (Japanese Patent Publication No. 32757/1972); a method of introducing polycarbodiimide linkage (Japanese Patent Publication No. 4591/1971); a method of introducing a urethane linkage and carbodiimide linkage (Japanese Unexamined Patent Publication No. 30796/1972). These modified polyisocyanurate foams have improved friability and bursting property which are imparted by the modification, but still have the disadvantages of decreased flame-resistance and flame-retardance and high smoke-generation. No process for preparing a polyisocyanurate foam which simultaneously possesses the four characteristics of low-smoke-generation, low friability, high flame-resistance and high flame-retardance has yet been proposed.

The inventors have sought to obtain a process for preparing a polyisocyanurate foam having said four characteristics.

SUMMARY OF THE INVENTION:

It is an object of this invention to provide a process for preparing a polyisocyanurate foam having the four characteristics of low smoke-generation, low friability, high flame-resistance, and high flame-retardance and which does not suffer from the bursting phenomenon. This and the other objects of the present invention have been attained by providing a process for preparing a polyisocyanurate foam by reacting an organic polyisocyante in the presence of a blowing agent, an isocyanate-trimerization catalyst, a surfactant, a modifier and additives, wherein the reaction is conducted in the presence of an organosilicate having the formula Si(OR)$_4$ or R$_n$Si(OR')$_{4-n}$ wherein R and R' are the same or different and represent an aliphatic, alicyclic or aromatic hydrocarbon group having 1-12 carbon atoms which can have a substituent, the four R's can be the same or different, and n is an integer of 1 to 3.

DETAILED DESCRIPTION OF THE PREFERRED EMBODIMENTS

The organosilicate having the formula

Si(OR)$_4$ or R$_n$Si(OR')$_{4-n}$ used in the process of the invention contains an aliphatic, alicyclic or aromatic hydrocarbon group having 1 to 12, preferably less than 7, more preferably less than 5 carbon atoms which can have a substituent such as a halogen or a carboxylic acid ester group which is inert to an isocyanate and also a hydroxyl, oxylane or amide group which is active to an isocyanate. Typical organosilicates having the formula Si(OR)$_4$ include tetramethyl silicate, tetraethyl silicate, tetra-isopropyl silicate, tetra-n-butylsilicate, tetra-isobutyl silicate, tetra-n-amyl silicate, tetra-n-heptyl silicate, tetra-n-octyl silicate, tetrakis(2-ethylhexyl) silicate, tetrakis($\beta$-chloroethyl)silicate, tetrakis($\beta$-oxyethyl) silicate, tetra-allyl silicate, triethyl isoamyl silicate, dimethyl diisoamyl silicate, diethyl diisoamyl silicate, ethyl triisoamyl silicate, tetraisoamyl silicate, trimethyl ethyl silicate, dimethyl diethyl silicate, methyl triethyl silicate, tetracyclohexyl silicate, tetraphenyl silicate, tetrabenzyl silicate, tetrakis($\beta$-phenethyl) silicate tetrakis(4-bromophenyl) silicate, tetrakis(4-tert-amylphenyl) silicate, tetra($\alpha$-naphthyl) silicate, tetra(o-tolyl) silicate, tetra(m-tolyl) silicate, tetra(p-tolyl) silicate, tetraglycidyl silicate, tetrakis($\alpha$-ethoxycarbonylethyl) silicate and the like.

Typical organosilicates having the formula RSi(OR')$_3$ include methyl triethoxysilane CH$_3$Si(OC$_2$H$_5$)$_3$, butyl trimethoxysilane C$_4$H$_9$Si(OCH$_3$)$_3$, ethyl-tri-n-butoxysilane C$_2$H$_5$Si(OC$_4$H$_9$)$_3$, methyl triamyloxysilane CH$_3$Si(OC$_5$H$_{11}$)$_3$, phenyl tri-isopropoxysilane C$_6$H$_5$Si(O-iso-C$_3$H$_7$)$_3$, methyl triphenoxylsilane CH$_3$Si(OC$_6$H$_5$)$_3$, allyl triethoxysilane CH$_2$=CH.CH$_2$Si(OC$_2$H$_5$)$_3$, vinyl tris($\gamma$-methoxyethoxy) silane CH$_2$=CHSi(OCH$_2$CH$_2$OCH$_3$)$_3$, $\gamma$-glycidoxypropyl trimethoxysilane

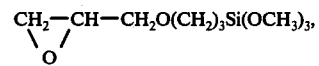

$\beta$-(3,4-epoxycyclohexyl) ethyl trimethoxysilane

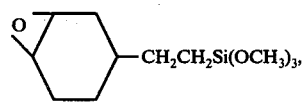

$\gamma$-methacryloyloxypropyl trimethoxysilane

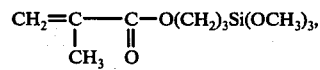

N-($\beta$-aminoethyl)-$\gamma$-aminopropyl trimethoxysilane H$_2$N(CH$_2$)$_2$NH (CH$_2$)$_3$Si(OCH$_3$)$_3$, ethyl dimethoxypropoxysilane C$_2$H$_5$Si(OCH$_3$)$_2$(OC$_3$H$_7$), vinyl diallyloxymethoxysilane CH$_2$=CHSi(OCH$_2$—CH=CH$_2$)$_2$.

(OCH$_3$), vinyl triethoxy silane CH$_2$=CHSi(OC$_2$H$_5$)$_3$, phenyl triethoxy silane C$_6$H$_5$Si(OC$_2$H$_5$)$_3$ and the like.

Typical organosilicates having the formula R$_2$Si(OR')$_2$ include dimethyl diethoxysilane (CH$_3$)$_2$Si(OC$_2$H$_5$)$_2$, dimethyl di n-propoxysilane (CH$_3$)$_2$Si(O—nC$_3$H$_7$)$_2$, ditolyl diethoxysilane (CH$_3$C$_6$H$_4$)$_2$Si(OC$_2$H$_5$)$_2$, dimethyl diglycidoxysilane

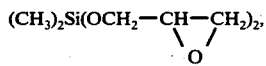

[N-($\beta$-aminoethyl)-$\gamma$-aminopropyl]-methyl dimethoxysilane

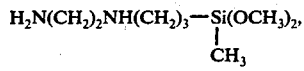

diphenyl and dipropoxysilane (C$_6$H$_5$)$_2$Si(OC$_3$H$_7$)$_2$. Typical organosilicates having the formula R$_3$Si(OR') include trimethyl ethoxysilane (CH$_3$)$_3$Si(OC$_2$H$_5$), trimethyl n-butoxysilane (CH$_3$)$_3$Si(O—n—C$_4$H$_9$), trimethylphenoxysilane (CH$_3$)$_3$Si(OC$_6$H$_5$), triethyl ($\beta$-chloroethoxy) silane (C$_2$H$_5$)$_3$Si(OCH$_2$CH$_2$Cl), and trimethyl ($\beta$-hydroxyethoxy) silane (CH$_3$)$_3$Si(OC$_2$H$_4$OH). Among the above-mentioned organosilicates, those having the formula Si(OR)$_4$ and RSi(OR')$_3$ are preferred and Si(OC$_2$H$_5$)$_4$, CH$_2$=CHSi(OC$_2$H$_5$)$_3$ and CH$_3$Si(OC$_2$H$_5$)$_3$ are more preferred.

It is possible to use said organosilicates alone or as a mixture. These organosilicates can be easily produced by a dehydrochloric acid reaction using silicon tetrahalides or organohalosilane and monohydric alcohols or phenols.

The amount of the organosilicate relative to the polyisocyanurate foam is 0.2 - 3 wt.%, preferably 0.5 -1.7 wt.%, especially 0.7 - 1.5 wt.% as Si. For example, when tetraethyl silicate is added at a ratio of 0.2 wt.% flame-resistance and elimination of the bursting property are found, however a slight deformation is observed when the product is contacted with a flame for a long time. When the proportion is 0.5 wt.% as Si(3.7 wt.% as tetraethyl silicate), the degree of deformation is reduced.

When it is 0.7 to 1.5 wt.% as Si(5.2 to 11.1 wt.% as tetraethyl silicate), deformation is essentially not present. With regard to smoke-generation, sufficient smoke-suppression is found by the addition of the organosilicate at a content of more than 0.5 wt.% as Si, wherein a small degree of white smoke is generated by flame contact. This smoke suppression effect is unexpected in comparison with the fact that a large degree of black smoke is generated until the surface layer is carbonized when the conventional unmodified or modified polyisocyanurate foam is touched to a flame. The mechanism by which organosilicates achieve the smoke suppression effect according to this invention has not yet been made fully clear, but the organosilicates employed in this invention do easily dissolve in the raw materials. Therefore it is assumed that the organosilicates are molecularly dispersed uniformly in the foam and when the foam is exposed to a flame, the uniformly dispersed Si molecules contribute to suppress the generation of smoke. However, inorganic silicon compounds such as SiO$_2$ do not dissolve in the raw materials and are distributed in the foam. Therefore it is assumed that they are not uniformly dispersed in the foam and the smoke suppression effect is inadequate. Regarding methods of addition of the organosilicate, the organosilicate having no reactive substituent is inert to all of the components for the polyisocyanurate foam and has higher solubility. Accordingly, it is possible to prepare a uniform solution by admixing the organosilicate with the catalyst, the surfactant, the modifier or a mixture thereof or the polyisocyanate.

On the other hand, the organosilicate having a reactive substituent is used in the reaction by previously admixing it with the components except for the polyisocyanate.

The effects of the organosilicate used in the invention are (a) excellent smoke-suppression, (b) an elimination of the bursting property; (c) a surface active effect (the effect of foam uniformity is achieved although it is slightly weaker than that of the commercial organosilicone surfactants for polyurethane foam, and a foam having fine cellular voids can be prepared without using such organosilicone surfactants); (d) the solubilizing effect (a solubility of the alkali metal salt type isocyanate-trimerization catalyst is increased thereby accelerating trimerization) and the like.

The addition of the organosilicate imparts various unexpected effects together with low smoke-generation. In this process of the invention, the organic polyisocyanates are organic compounds having two or more NCO groups in one molecule and include aliphatic and aromatic polyisocyanate monomers, mixtures thereof and modified compounds thereof.

Typical aliphatic polyisocyanates include hexamethylenediisocyanate, isophoronediisocyanate, dicyclohexylmethanediisocyanate, methyl cyclohexanediisocyanate and the like. Typical aromatic polyisocyanates include tolylenediisocyanate (2,4-and/or 2,6-isomer, diphenylmethanediisocyanate, bitolylenediisocyanate, naphthylenediisocyanate (such as 1,5-naphthylenediisocyanate), triphenylmethanetriisocyanate, dianisidinediisocyanate, xylylenediisocyanate, tri(isocyanatephenyl) thiophosphate, polynuclear polyisocyanate having the formula (I)

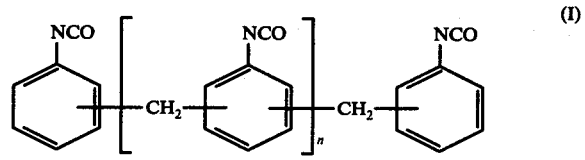

(wherein $n$ is an integer of 0 - 10) (crude MDI or polymeric isocyanate) which is produced by reacting phosgene with a condensation product of aniline and formaldehyde; an undistilled tolylenediisocyanate and polyisocyanates having isocyanurate rings which are produced by reacting an organic dihalide with a metal salt of cyanic acid such as the compounds having the formula (II)

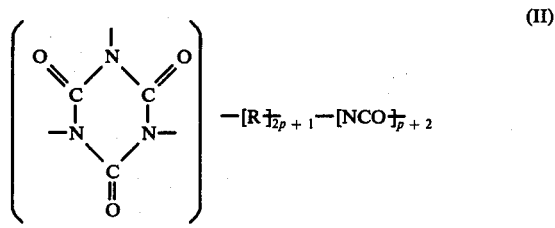

(wherein R is a divalent hydrocarbon radical and p is an integer of 1 – 6)
(Refer to Japanese Unexamined Patent Publication No. 51396/1974; Japanese Patent Publication Nos. 31998/1973; 7269/1972; and 8309/1971). In this process of the invention, it is possible to use modified products of the polyisocyanate monomers; such as the polyisocyanates having biuret, allophanate, isocyanurate, carbodiimide, oxazolidone, amide, imide etc. which are produced by modifying said polyisocyanates. (Refer to Japanese Patent Publication Nos. 880/1973; 5636/1974 and 32800/1974 and Japanese Unexamined Patent Publication 197/1971.)

The modified polyisocyanates also include prepolymers having terminal NCO groups produced by reacting a polyol with an equivalent or excess amount of polyisocyanate; such as polyisocyanates having urethane linkages which are produced by reacting trimethylolpropane with tolylenediisocyanate at a molar ratio of 1:3 or more; and prepolymers produced by reacting a small amount of a polyol with a polymeric isocyanate in the conventional process. The organic polyisocyanates which are preferably used in the process of this invention are aromatic polyisocyanates especially the polyisocyanates having the formula (I) or (II) and modified products thereof. The optimum organic polyisocyanates are the polymeric isocyanates having the formula (I) and the modified products thereof. The blowing agents used in the process of the invention include the conventional blowing agents used for the preparation of urethane foam and isocyanurate foam. Typical blowing agents include (a) inert solvents having a low boiling point such as trichloro-monofluoromethane, dichlorodifluoromethane, dibromotetrafluoroethane, trichlorotrifluoroethane, methylenechloride, pentane, trichloroethane, benzene, n-hexane and the like; (b) compounds which generate carbon dioxide by reacting with an isocyanate such as water, hydrated water containing compounds, nitroalkanes, aldoximes, acid amides, enolizable compounds and the like; (c) compounds which generate gas by thermal decomposition by the heat or reaction provided in the formation of the foam such as sodium bicarbonate, ammonium bicarbonate, azobisisobutyronitrile, azoaminobenzol, dinitrosopentamethylene-tetramine and the like. The preferable blowing agents are the compounds included in the group (a) and the optimum blowing agent is trichloromonofluoromethane.

The isocyanate-trimerization catalysts used in the process of the invention include compounds which have a catalytic activity for trimerizing isocyanate groups. It is preferable to use a catalyst which has high activity for accelerating trimerization since the reaction for preparing the foam is usually initiated at room temperature and is preferably completed within a short time such as 1–5 minutes. The isocyanate-trimerization catalysts by which the polyisocyanate is solidified at 100° C within 10 minutes are preferably used. These catalysts are disclosed in Japanese Patent Publication Nos. 2799/1960; 5838/1965; 16669/1969; 13257/1971; 15298/1971; 25017/1971; 31531/1971; 33577/1971; 37503/1971; 41393/1971; 41610/1971; 36038/1972; 35720/1973; Japanese Unexamined Patent Publication Nos. 29491/1972; 49898/1973; and 81996/1973.

Typical isocyanate-trimerization catalysts include (a) tertiary amines such as triethylamine, N, N', N''-tris (dimethylaminopropyl) hexahydrotriazine, 2, 4, 6-tris(-dimethylaminomethyl) phenol, tetramethyl ethylenediamine, diazabicyclo-alkane (e.g. DABCO), mannich bases produced by the reaction of formaldehyde, dimethylamine and phenol or phenol having an alkyl substituent, cycloamidines and the like; (b) mixtures of a tertiary amine and a promotor, such as ethanol, mono-N-substituted carbamic acid esters, water, aliphatic aldehydes, tertiary imines, benzoyl peroxide, ethylenecarbonate, α-diketones (e.g. diacetyl) and various epoxy compounds; (c) tertiary phosphines such as triethyl phosphine; (d) alkali metal salts of imides such as potassium phthalimide, sodium succinimide and the like; (e) organic onium compounds such as tetraethyl ammonium hydroxide, benzyl triethylammonium hydroxide, tetraethyl phosphonium hydroxide, trimethyl sulfonium hydroxide, (quaternary hydroxides having N.P.S. As or Sb) and the compound having the formula (III)

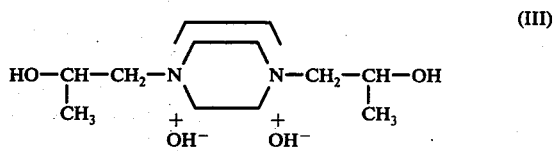

(III)

(f) ethyleneimines such as N-butyl ethyleneimine, 2-hydroxyethyl ethyleneimine and the like; (g) metal salts of carboxylic acid such as potassium acetate, potassium 2-ethylhexanoate, lead 2-ethylhexanoate, sodium benzoate, potassium naphthenate, tin octanoate and the like; (h) basic inorganic compounds such as potassium carbonate, calcium hydroxide, barium oxide, potassium hydroxide, sodium hydroxide and and like; (i) alcolates and phenolates such as sodium methoxide, potassium phenolate, sodium trichlorophenolate and the like; (j) Ti- and Sb-compounds such as tetra-butyl titanate, tri-n-butyl antimonyoxide and the like; (k) Friedel-Crafts catalysts such as zinc chloride, tin chloride, ferric chloride, antimony pentachloride, aluminum chloride, borontrifluoride and the like; (l) alkali metal complexes such as alkali metal complexes of salicylaldehyde, acetylacetone, o-hydroxyacetophenone or quinizarine; alkali metal complexes of tetra-valent boron compounds e.g. $[(R^1O)_3 BOR^2]^{31} M^+$ (M:-an alkali metal; $R^1$ and $R^2$ : mono-valent organic group) and the like.

It is not always necessary to add a surfactant in the process of the invention and yet it is preferable to add a surfactant for forming a desirable foam structure. The surfactants include nonionic surfactants anionic surfactants and cationic surfactants. It is preferable to use organopolysiloxane-polyoxyalkylene copolymers.

(Refer to Japanese Patent Publication Nos. 10543/1960; 13344/1961; 8850/1962; 347/1963; 7149/1963; 1850/1964; 20537/1964; 24731/1964; 12190/1965; 2719/1967; 3117/1967; 3798/1967; 4997/1967; 11678/1967; and 13635/1067.

It is also preferable to use copolymers of vinylsilane-polyoxyalkylenepolyol. (Refer to Japanese Patent Publication Nos. 12310/1965; 3559/1966; 5954/1966; and 5955/1966).

It is also possible to use the other additives if desirable. Typical additives include flame-retardants such as phosphorus or halogen-containing organic compounds, halogen-containing resins, antimony oxide, zinc oxide, aluminum hydroxide and the like; coloring agents such as pigments and dyes and inorganic fillers such as talc, diatomaceous earth, graphite; glass fiber and other inorganic fillers.

Typical processes for preparing polyisocyanurate foam can be classified as follows. (a) An organic polyisocyanate is admixed with a trimerization catalyst, a blowing agent and a surfactant and the mixture is foamed. (b) A modified polyisocyanurate foam is prepared either by blending a previously modified polyisocyanate produced by reacting a polynuclear polyisocyanate with a modifier, trimerization catalyst, a blowing agent, a surfactant etc. (prepolymer process) or by blending and foaming an unmodified polynuclear polyisocyanate, a modifier, a trimerization catalyst, a blowing agent, a surfactant etc. at the same time. (one shot process) (c) A polyol having isocyanate rings, a polyisocyanate, a blowing agent, a surfactant and an urethane-forming catalyst are blended and foamed. It is possible to select from the processes (a), (b) and (c) as desired.

In order to attain the object of the invention, it is preferable to use the process (a) reacting a polyisocyanate without a modifier in the presence of the organosilicate or the process (b) reacting a modified polyisocyanate in the presence of the organosilicate. The process (a) is the optimum use. The polyisocyanurate foam prepared by the process (c) has relatively inferior heat-resistance, and flame-resistance and smoke-generation properties in comparison with that of the processes (a) and (b). The modifiers for preparing the modified polyisocyanurate foams used in the process (b) include polyether polyols, polyester polyols, polyepoxides, polyesteramides, polyamines, polycarboxylic acids, liquid dienepolymers having terminal hydroxyl groups, oil and fats having a hydroxyl group and phenol resin prepolymers(novolak and resol).

In the modification reaction, the modifier is added at an equivalent ratio of NCO groups/modifier of more than 3, preferably 5-20. The process for preparing polyisocyanurate forms by using modifiers of polyethers is disclosed in Japanese Patent Publication No. 42386/1971. The process for preparing polyisocyanurate foams by using modifiers of polyesters is disclosed in Japanese Patent Publication No. 28919/1972.

The process for preparing polyisocyanurate foams by using modifiers of polycarboxylic acids or anhydrides thereof is disclosed in Japanese Patent Publication No. 42386/1971. Japanese Patents related to processes for preparing modified polyisocyanurate foams and isocyanate-trimerization catalysts are disclosed in Plastic Material Volume 16 No. 1 page 56 (1975).

Certain specific Examples are provided herein for purposes of illustration only and are not intended to be limiting in any manner unless otherwise specified. The evaluations of the polyisocyanurate forms were made in accordance with the following methods.

Smoke-generation

In accordance with ASTM D 2843-70. (XP-2 smokechamber test), a test piece having a size of $50^{mm} \times 50^{mm} \times 50^{mm}$ was burned in a box and the concentration of smoke generated in the box is shown as % light obscuration. The maximum % light obscuration and the time for reaching to the maximum % light obscuration are measured. A lower maximum % light obscuration and a longer time for reaching the maximum % light obscuration indicate lower smoke-generation.

Flame-resistance

In accordance with Bureau of Mines, Report of Investigation No. 6366 a test piece is measured. A longer flame penetration time indicates higher flame resistance.

Surface flammability

In accordance with the Butler Chimney Test (Krueger O. A. Jr. et al. J. Cellular Plastics, Vol. 3, page 497 (1967), the surface flammability is shown by % weight retention. A higher value indicates lower flammability. A test piece having a size of $18.75^{mm} \times 18.75^{mm} \times 100^{mm}$ is used. Accordingly, the data give about 10% smaller values than those of the test pieces having a normal length of 250 mm.

Friability

In accordance with ASTM C-421, friability is measured after 10 minutes operation as % weight loss. A lower value indicates lower friability.

Si %

Hereinafter, Si % designates the weight ratio of Si component of the organo-silicate to the total components the foam.

EXAMPLE 1

A 100 g of polymeric isocyanate(Trade name: Isonate-580 having 140 of NCO equivalent; manufactured by Upjon Co.) was admixed with 22 g of trichloromonofluoromethane to prepare A solution. On the other hand, 10 g of tetraethyl silicate(tetraethoxysilane) (0.98% as Si to total weight of the foam), 2 g of a silicone surfactant(Trade name: SH-193 manufactured by Toray Silicone Co. Ltd.), 1.0 g of N, N', N''-tris(dimethylamino-propyl) hexahydro-sym-triazine (hereinafter referring to as HHT) and 2.0 g of 30% ethyleneglycol solution of potassium acetate were admixed to prepare B solution. The A solution and the B solution were charged in a paper cup and the mixture was vigorously stirred to form a foam having a density of 0.035 g/cm$^3$. The characteristics of the foam were as follows. When the foam was touched to a flame, the foam had no bursting property and was not substantially deformed and expanded.

| | |
|---|---|
| Smoke-generation: | |
| (a) maximum % light obscuration | 90 % |
| (b) time for reaching to maximum % light obscruration | 40 seconds |
| Surface flammalbility: | |
| % weight retention | 84 % |
| Flame-resistance: | |
| flame penetration time | 85 minutes |
| After-flame time: | 0 second |
| Friability: | |
| % weight loss | 58 % |

As a reference, a foam was prepared by the process except removing tetraethyl silicate from the above-mentioned components. The smoke-generation of the foam was tested to give 96% of the maximum % light obscuration and 30 seconds of the time for reaching to the maximum % light obscuration. When the foam was touched to a flame, the deformation bursting, and expansion were found and a color of the smoke was black.

EXAMPLE 2

In accordance with the process of Example 1 using the same components under the same conditions except adding 2.0 g (Si % = 0.21%) of tetraethyl, a foam having a density of 0.035 g/cm³ was prepared under a cream time of 17 seconds and a rise time of 50 seconds. The characteristics of the foam were as follows.

| Smoke-generation: | |
|---|---|
| (a) | 89 % |
| (b) | 31 seconds |
| Surface flammability: | 84.5 % |
| Flame-resistance: | 120 minutes |
| After-flame time: | 0 second |
| Friability: | 66 % |

When the foam was touched to a flame, no bursting was found, though a slight deformation was found.

EXAMPLE 3

A 97 g of polymeric isocyanate(Trade name: Isonate 580 manufactured by Upjon Co.) was admixed with 3.0 g of polyepoxide (Trade name: Epikote 819 manufactured by Shell Chem. Co.) to react them at 100° C for 2 hours to obtain a polyoxazolidone modified polymeric isocyanate. A 100 g of the modified polymeric isocyanate was admixed with 22 g of trichloromonofluoromethane to prepare A solution. On the other hand, 10.0 g of tetraethyl silicate, 1.0 g (Si % = 1.0%) of HHT and 2.0 g of the ethyleneglycol solution of potassium acetate used in Example 1 were mixed to prepare B solution. The A solution and the B solution kept at 18° C were mixed and vigorously stirred to prepare a foam having a density of 0.043 g/cm³ under a cream time of 20 seconds and a rise time of 45 seconds.
The characteristics of the foam were as follows.

| Smoke-generation: | |
|---|---|
| (a) | 95 % |
| (b) | 52 seconds |
| Surface flammability: | 79 % |
| Flame-resistance: | 50 minutes |
| After-flame time: | 3 seconds |
| Friability: | 32 % |

EXAMPLE 4

In accordance with the process of Example 1 using the same components under the same conditions except adding 10 g (Si % = 0.6%) of tetraglycidyl silicate instead of tetraethyl silicate, a foam having a density of 0.033 g/cm³ was prepared under a cream time of 10 seconds and a rise time of 35 seconds. The foam had no bursting property and was not deformed or expanded by heating with a flame.
The characteristics of the foam were as follows.

| Smoke-generation: | |
|---|---|
| (a) | 73 % |
| (b) | 55 seconds |
| Surface flammability: | 83 % |
| Flame-resistance: | 92 minutes |
| After-flame time: | 0 second |
| Friability: | 60 % |

EXAMPLE 5

In accordance with the process of Example 1 using the same components under the same conditions except removing the silicone surfactant (SH-193), a rigid foam having a density of 0.033 g/cm³ was prepared. The foam had substantially same flame-resistance and smoke-generation with those of Example 1. Accordingly, a desirable surface active effect was given by the addition of tetraethyl silicate.

EXAMPLE 6

In accordance with the process of Example 1 using the same components under the same conditions except using 8.0 g (Si % = 0.42%) of tetraphenyl silicate instead of 10 g of tetraethyl silicate, a foam having a density of 0.038 g/cm³ was prepared at 18° C under a cream time of 12 seconds and a rise time of 17 seconds.
The characteristics of the foam were as follows.

| Smoke-generation: | |
|---|---|
| (a) | 95 % |
| (b) | 42 seconds |
| Surface flammability: | 83.3 % |
| After-flame time: | 0 second |
| Friability: | 92 % |

EXAMPLE 7

A 100 g of polymeric isocyanate(Trade name: Isonate-580 having 140 of NCO equivalent, manufactured by Upjon Co.) was admixed with 22 g of trichloromonofluoromethane to prepare A solution. On the other hand, 10 g (Si % = 0.85%) of phenyl triethoxysilane[$C_6H_5Si(OC_2H_5)_3$] 2 g of a silicone surfactant(-Trade name: SH-193 manufactured by Torey Silicone Co. Ltd.), 1.0 g of HHT and 2.0 g of 30% ethyleneglycol solution of potassium acetate were admixed to prepare B solution.

The A solution and the B solution were charged in a paper cup and the mixture was vigorously stirred to form a foam having a density of 0.031 g/cm³, at 17° C under a cream time of 18 seconds and a rise time of 60 seconds. When the foam was touched to a flame, the foam had no bursting property and was not substantially deformed.
The characteristics of the foam were as follows.

| Smoke-generation: | |
|---|---|
| (a) | 96 % |
| (b) | 42 seconds |
| Surface flammability: | 82 % |
| Flame-resistance: | 70 minutes |
| After-flame time: | 0 second |
| Friability: | 78 % |

EXAMPLE 8

In accordance with the process of Example 7 using the same components under the same conditions except adding 10 g (Si % = 1.13%) of methyl triethoxysilane [$CH_3Si(OC_2H_5)_3$] instead of phenyl triethoxysilane and changing the amount of the ethyleneglycol solution of potassium acetate from 2.0 g to 4.0 g, a foam having a density of 0.033 g/cm³ was prepared under a cream time of 10 seconds and a rise time of 35 seconds. The foam had no bursting property.
The characteristics of the foam were as follows.

| Smoke-generation: | |
|---|---|
| (a) | 97 % |
| (b) | 46 seconds |
| Surface flammability: | 67.4 % |
| Flame-resistance: | 63 minutes |
| After-flame time: | 3 seconds |
| Friability: | 45 % |

EXAMPLE 9

In accordance with the process of Example 7 using the same components under the same conditions except adding 11.5 g (Si % = 0.99%) of glycidoxypropyl trimethoxysilane

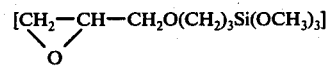

instead of phenyl triethoxysilane, a foam having a density of 0.033 g/cm³ was prepared under a cream time of 10 seconds and a rise time of 35 seconds. The foam had no bursting property, and was not substantially deformed and expanded by heating it with a flame.

The characteristics of the foam were as follows.

| Smoke-generation: | |
|---|---|
| (a) | 96 % |
| (b) | 52 seconds |
| Surface flameability: | 82 % |
| Flame-resistance: | 97 minutes |
| After-flame time: | 0 second |
| Friability: | 65 % |

EXAMPLE 10

In accordance with the process of Example 7 using the same components under the same conditions except adding 10.0 g (Si % = 0.73%) of vinyl tris($\beta$-methoxyethoxy) silane [$CH_2=CHSi(OCH_2CH_2OCH_3)_3$] instead of phenyl triethoxysilane, a foam having a density of 0.033 g/cm³ was prepared under a cream time of 22 seconds and a rise time of 60 seconds.

The characteristics of the foam were as follows. The foam had no bursting property and the deformation and expansion of the foam caused by touching to a flame were slight.

| Smoke-generation: | |
|---|---|
| (a) | 94 % |
| (b) | 61 seconds |
| Surface flammability: | 82 % |
| Flame-resistance: | 145 minutes |
| After-flame time: | 0 second |
| Friability: | 65 % |

EXAMPLE 11

A 97 g of polymeric isocyanate(Trade name: Isonate 580 manufactured by Upjon Co.) was admixed with 3.0 g of polyepoxide(Trade name: Epikote 819 manufactured by Shell Chem. Co.) to react them at 100° C for 2 hours to obtain a polyoxazolidone modified polymeric isocyanate. A 100 g of the modified polymeric isocyanate was admixed with 22 g of trichlorofluoromethane to prepare A solution. On the other hand, 10.0 g (Si % = 1.17%) of methyl triethoxysilane, 1.0 g of HHT and 2.0 g of the ethyleneglycol solution of potassium acetate used in Example 7 were mixed to prepare B solution. The A solution and the B solution were mixed and vigorously stirred to prepare a foam having a density of 0.043 g/cm³ under a cream time of 20 seconds and a rise time of 45 seconds.

The characteristics of the foam were as follows.

| Smoke-generation: | |
|---|---|
| (a) | 94 % |
| (b) | 50 seconds |
| Surface flammability: | 78 % |
| Flame-resistance: | 49 minutes |
| After-flame time: | 3 seconds |
| Friability: | 28 % |

EXAMPLE 12

In accordance with the process of Example 1 using the same components under the same conditions except adding 10 g (Si % = 1.1%) of vinyltriethoxysilane [$CH_2 = CHSi(OC_2H_5)_3$] instead of tetraethyl silicate, a foam having a density of 0.036 g/cm³ was prepared at 15° – 16° C under a cream time of 22 seconds and a rise time of 60 seconds. The characteristics of the foam were as follows. As a reference, the characteristics of the foam prepared without using vinyltriethoxysilane.

| | Exp. 12 | Ref. |
|---|---|---|
| Smoke generation | | |
| (a) | 98% | (96%) |
| (b) | 41.3 seconds | (34 seconds) |
| Surface flammability | 86.5% | (81%) |
| Flame-resistance | 135 minutes | (70 minutes) |
| After-flame time | 0 second | (0 second) |
| Friability | 60% | (65%) |

EXAMPLE 13

In accordance with the process of Example 1 using the same components under the same conditions except adding 10 g (Si % = 0.76%) of tetrakis ($\beta$-oxyethyl) silicate [$Si(OC_2H_4OH)_4$] instead of tetraethyl silicate and changing the amount of trichloromonofluoromethane from 22 g to 20 g, a foam having a density of 0.031 g/cm³ was prepared. The characteristics of the foam were as follows.

| Smoke generation | |
|---|---|
| (a) | 90% |
| (b) | 45 seconds |
| Surface flammability | 75% |
| Flame-resistance | 70 minutes |
| After-flame time | 0.5 second |
| Friability | 67% |

COMPARATIVE EXAMPLE 1

A foam was prepared using an inorganic silicon compound. In accordance with the process of Example 1 using the same compounds under the same conditions except adding 3 g of $SiO_2$ instead of tetraethyl silicate and changing the amount of trichloromonofluoromethane from 22 g to 20 g, a foam having a density of 0.025 g/cm³ was prepared at 15° – 16° C under a cream time of 10 seconds and a rise time of 60 seconds.

The characteristics of the foam were as follows. As a reference, a foam having a density of 0.036 g/cm³ was prepared in accordance with the above-mentioned process except adding 5 g of tetraethyl silicate instead of $SiO_2$ under a cream time of 15 seconds and under a rise time of 45 seconds.

|  | Comp. Exp. 1 | Ref. |
|---|---|---|
| Smoke generation | | |
| (a) | 97% | (90%) |
| (b) | 28 seconds | (40 seconds) |
| Surface flammability | 72% | (83.8%) |
| Flame-resistance | 48 minutes | (85 minutes) |
| After-flame time | 0.5 second | (0 second) |
| Friability | 95.5% | (58%) |

A weight % of Si to the total weight of the foam is 1.11% as to $SiO_2$ and 0.53% as to tetraethyl silicate and the Si % of the foam using $SiO_2$ is higher than that of the foam using tetraethyl silicate, however, the characteristics of the foam using $SiO_2$ is inferior. It is clear from this example, that smoke suppression effect depends not only on Si %, but seems to depend on the condition of Si dispersed in the foam as hereinbefore described.

EXAMPLES 14 and 15

In accordance with the process of Example using the same components under the same conditions except changing the amounts of tetraethyl silicate, HHT and 30% ethyleneglycol solution of potassium acetate as shown in the following Table 1, each foam was prepared.

The characteristics of the foams were also shown in Table 1.

Table 1

| Example No. | 14 | 15 |
|---|---|---|
| $Si(OC_2H_5)_4$ (g) | 20 | 30 |
|  | (Si%: 1.80%) | (Si%: 2.52%) |
| HHT (g) | 2 | 2 |
| 30% ethyleneglycol sol. of $CH_3COOK$ (g) | 4 | 4 |
| Characteristics | | |
| Foamdensity (g/cm³) | 0.207 | 0.262 |
| Smoke generation | | |
| (a) | 99% | 97% |
| (b) | 90 sec. | 94.3 sec. |

What is claimed as new and intended to be covered by letters patent is:

1. In a process for preparing a smoke-retardant polyisocyanurate foam by reacting an organic polyisocyanate in the presence of a blowing agent and an isocyanate-trimerization catalyst, an improvement characterized in that the reaction is conducted in the presence of from 0.7 to 1.5 wt. %, as Si, of an organosilicate having the formula $Si(OR)_4$ or $R_nSi(OR')_{4-n}$ wherein R and R' are the same or different and represent aliphatic, alicyclic and aromatic hydrocarbon groups having 1 – 12 carbon atoms or substituted derivatives thereof and n is an integer of 1 to 3.

2. The process according to claim 1, wherein an organosilicate having the formula $Si(OR)_4$ is added in an amount of 0.7–1.5 wt. % as Si derived from the organosilicate relative to the weight of the foam.

3. The process according to claim 1, wherein an organosilicate having the formula $R Si(OR')_3$ is added in an amount of 0.7–1.5 wt. % as Si derived from the organosilicate relative to the weight of the foam.

4. The process according to claim 1, wherein an organic polyisocyanate which is produced by reacting phosgene with a condensation product of aniline and formaldehyde is used as the polyisocyanate.

5. The process according to claim 1, wherein a modified polyisocyanate which is produced by reacting a polyisocyanate with a modifier selected from the group consisting of polyether polyols, polyester polyols, polyepoxides, polyester amides, polyamines, polycarboxylic acids, liquid diene polymers having terminal hydroxyl groups, oils and fats having hydroxy groups and phenol resin prepolymers, is used as the polyisocyanate, and wherein the equivalent ratio of NCO groups to the modifier is 5–20.

6. The process according to claim 1, wherein the organosilicate is admixed with the isocyanate trimerization catalyst, and this mixture is admixed with this polyisocyanate and the blowing agent.

7. The process according to claim 1, wherein the organosilicate is admixed with the isocyanate-trimerization catalyst, the blowing agent and other additives and this mixture is admixed with the polyisocyanate.

8. The process according to claim 1, wherein the organosilicate is $Si(OR)_4$ or $RSi(OR')_3$ in which R and R' are both an aliphatic hydrocarbon groups having 2 to 5 carbon atoms.

9. A polyisocyanurate foam which contains an organosilicate having the formula $Si(OR)_4$ or $R_nSi(OR')_{4-n}$ wherein R and R' are the same or different and represent aliphatic, alicyclic and aromatic hydrocarbon groups having 1 – 12 carbon atoms or substituted derivatives thereof and n is an integer of 1–3, in an amount of 0.7–1.5 wt.% as Si derived from the organosilicate relative to the weight of the foam.

10. The polyisocyanurate foam according to claim 9, wherein the organosilicate is $Si(OR)_4$ in which R is an aliphatic hydrocarbon group having 1 – 12 carbon atoms.

11. The polyisocyanurate foam according to claim 9, wherein the organosilicate is $Si(OR)_4$, $RSi(OR')_3$ or mixtures thereof.

12. The polyisocyanurate foam according to claim 11, wherein R and R' are the same or different and both are aliphatic hydrocarbon groups having 1 – 12 carbon atoms or substituted derivatives thereof.

13. The polyisocyanurate foam according to claim 10, wherein R is an aliphatic hydrocarbon group having 2 to 5 carbon atoms or a substituted derivative thereof.

* * * * *